United States Patent [19]
Smid et al.

[11] 4,386,233
[45] May 31, 1983

[54] CRYTOGRAPHIC KEY NOTARIZATION METHODS AND APPARATUS

[76] Inventors: Miles E. Smid, Silver Spring; Dennis K. Branstad, Gaithersburg, both of Md.

[21] Appl. No.: 192,129

[22] Filed: Sep. 29, 1980

[51] Int. Cl.³ .............................................. H04L 9/00
[52] U.S. Cl. ................................ 178/22.08; 178/22.14
[58] Field of Search ............... 178/22.07, 22.08, 22.11, 178/22.13, 22.14

[56] References Cited

U.S. PATENT DOCUMENTS

| | | | |
|---|---|---|---|
| 3,798,359 | 3/1974 | Feistel | 178/22.08 |
| 3,798,605 | 3/1974 | Feistel | 178/22.08 |
| 4,193,131 | 3/1980 | Lennon et al. | 178/22.08 |
| 4,206,315 | 6/1980 | Matyas et al. | 178/22.08 |
| 4,264,782 | 4/1981 | Konheim | 178/22.08 |
| 4,310,720 | 1/1982 | Check, Jr. | 178/22.08 |
| 4,315,101 | 2/1982 | Atalla | 178/22.08 |

OTHER PUBLICATIONS

Foundations of Secure Computation, Academic Press, N.Y., (1978) De Millo et al., pp. 133-151.
IBM Systems Journal, vol. 17, No. 2 (1978) pp. 106-124 Ehrsam et al.
FIPS Pub. 46 (1/15/77) Data Encryption Standard.
IBM Tech. Disclosure Bulletin vol. 20, No. 10 (3/78) pp. 3990-3992, Ehrsam et al.
IBM Tech. Disclosure Bulletin, vol. 20, No. 10 (3/78) pp. 3986-3989 Ehrsam et al.
Conf. of Comp. Sec. and DES (2/15/77) Campbell et al.
IEEE Trans. on Comm., vol. Com.-29, No. 6 (6/81) Smip pp. 762-772.

*Primary Examiner*—Sal Cangialosi

[57] ABSTRACT

Cryptographic keys for a cryptographic function are notarized by encrypting the keys with the cryptographic function using a notarizing cryptographic key derived from identifier designations associated with the encryptor and intended decryptor, respectively, and an interchange key which is accessible only to authorized users of the cryptographic function. Preferably, the identity of a user of the cryptographic function is authenticated as a condition to access to an interchange key. Advantageously, authentication is accomplished by comparing a password designation supplied by the user with a prestored version thereof which has been notarized by having been encrypted with the cryptograpic function using a notarizing cryptographic key derived from the identifier designation of the corresponding authorized user and an interchange key. Signature properties similar to those provided by public key systems are provided for nonpublic keys by allowing a user to use a key for only encryption or decryption and not both. Preferably, this is attained through the use of user identifiers which are combined in predetermined combinations for data key notarization and notarized data key decryption in dependence on whether a key is to be used for encryption or decryption.

21 Claims, 10 Drawing Figures

CRYTOGRAPHIC KEY NOTARIZATION METHODS AND APPARATUS

FIELD OF THE INVENTION

The present invention relates in general to cryptographic methods and apparatus and in particular to cryptographic key management methods and apparatus which protect cryptoalgorithm keys from disclosure and substitution.

BACKGROUND OF THE INVENTION

With electronic automatic data processing (ADP) expanding into virtually every sphere of societal activity, and with the increasing accessibility of data through interconnected computer networks, the need to protect stored information and to allow local and remote users to communicate securely both on and off-line has become critical. In response to this need, there has been a growing awareness that, for many applications, data encryption offers the only effective means of protecting information. The first applications of the encryption of unclassified data were in the area of electronic funds transfer. The passage of the Privacy Act of 1974 (5 USC 522a) and the issuance of Transmittal Memorandum No. 1 by the Office of Management and Budget to its Circular A-71 have placed added responsibilities on Federal data systems for the protection of nonfinancial data as well.

Conventionally, data encryption entails the use of a cryptographic function such as a cryptoalgorithm that transforms the data to an unintelligible form, called cipher, using a complex series of transformations and substitutions. The cryptoalgorithm is tailored to specific users by means of individual cryptographic keys. An encryption algorithm incorporating a user selected key is used to disguise (encrypt) the data. With nonpublic key cryptoalgorithms, the key used to encrypt data is also used to decrypt data. Only a holder of the key has the capability to unscramble (decrypt) the cipher. In public key systems the decryption key is not equal to, and cannot be computed from, the encryption key. Encryption keys may be made public while decryption keys are kept secret. Cryptographic keys are often stored in and transferred through areas to which unauthorized parties may have access. At such times keys traditionally have been encrypted, using another key, so as to prevent their disclosure.

In 1977 the U.S. National Bureau of Standards (NBS) published a completely defined nonpublic key cryptoalgorithm known as the Data Encryption Standard (DES) which became the Federal standard for protection of unclassified data. The DES cryptoalgorithm is described in Federal Information Processing Standards Publication (FIPS PUB) 46, National Technical Information Service (1977) and in U.S. Pat. Nos. 3,796,830 (Smith) and 3,798,359 (Feistel), each of which is hereby incorporated herein by reference. However, even before the DES was adopted, it was clear that there was more to cryptographic security than a secure encryption algorithm. Efforts were initiated by NBS to have additional standards, based on the DES, developed. An area which needed to be addressed was secure key management. DES keys are 64-bit binary vectors which are individually selected in order to provide the unknown quantity necessary for security in the encryption algorithm. Key management involves the secure generation, distribution, storage and destruction of cryptographic keys. If the key management is weak, then the most secure cryptoalgorithm will be of little value. In fact, a very strong cryptoalgorithm used in a weak key management system can give a false sense of security.

Ideally, a secure key management system for ADP applications (1) allows secure on-line communication between any two users at speeds sufficient for normal network communications; (2) allows secure off-line communication, for example, via encrypted mail, without the need for an interactive key exchanging system in which the receipt of keys can be immediately acknowledged; (3) protects files against unauthorized disclosure; (4) provides a "digital signature" capability; (5) protects against key substitution; (6) allows data to be authenticated; and (7) allows system users to be authenticated.

An example of a prior art key management system, which employs a host master key to encrypt other keys, is described in Ehrsam et al, "A Cryptographic Key Management Scheme For Implementing the Data Encryption Standard, " 17 *IBM Systems Journal* 106 (1978). However, in such conventional cryptographic systems, encryption alone of a cryptographic key only prevents key disclosure, and not key substitution, i.e., the replacement of one encrypted key by another either unintentionally or intentionally. Since the replacement key may be controlled by an unauthorized party, substitution may result in the compromise of encrypted data without the disclosure of any keys.

Digital signatures were developed in conjunction with public key systems, and are used to prove that a message was sent by a specific user (the transmitter or encryptor) to another specific user (the receiver or decryptor.) A digital signature is transformed using the secret decryption key of the transmitter and is sent to the receiver. The receiver may encrypt, using the public key, and verify the signature, but the signature cannot be forged since only the transmitter knows the secret decryption key. (The cryptoalgorithm must have the property that decryption of the signature followed by encryption equals the original signature.) It has been shown that nonpublic key algorithms can also be used for digital signatures in conjunction with a "Network Registry," see Popek, et al., "Encryption Protocols, Public Key Algorithms and Digital Signatures in Computer Networks," *Foundations of Secure Computation*, Academic Press (1978). However, heretofore digital signatures have required special computations not normally used for all messages and often greatly expand the signature size upon transmission.

SUMMARY OF THE INVENTION

The disadvantages of the prior art are overcome with respect to both public and nonpublic key cryptographic functions and the requirements for secure key management noted hereinabove are met by the methods and apparatus of the present invention. Basically, the invention entails notarizing cryptographic keys for a cryptographic function by encrypting the keys with the cryptographic function using a notarizing cryptographic key derived from identifier designations associated with the encryptor and intended decryptor, respectively, and an interchange key which is accessible only to authorized users of the cryptographic function. Preferably, the identity of a user of the cryptographic function is authenticated as a condition to access to an interchange key. Advantageously, authentication is accomplished by comparing a password designation supplied by the user with a prestored version thereof which has been notarized by having been encrypted with the cryptographic function using a notarizing cryptographic key derived from the identifier designation of the corresponding authorized user and an interchange key. Alternatively, authentication is accomplished by controlling access to the cryptographic function by encrypting user commands with a cryptographic function using a password supplied by the user as the cryptographic key and then decrypting the encrypted commands using a prestored version of the password as the cryptographic key.

Signature properties similar to those provided by public key systems are provided by the present invention for nonpublic keys by allowing a user to use a key for only encryption or decryption and not both. Preferably, this separation of encryption and decryption capabilities is attained through the use of user identifiers which are combined in predetermined arrangements for data key notarization and notarized data key decryption in dependence on whether a key is to be used for encryption or decryption.

Preferably, in accordance with the present invention a notarizing key is derived by concatenating the binary equivalent of the encryptor's identifier designation with the binary equivalent of the decryptor's identifier designation as an ordered pair and logically combining, preferably using an exclusive-or operation, the concatenated result with the interchange key.

Cryptographic apparatus in accordance with the present invention advantageously comprises apparatus selectively operable in an encrypt or decrypt mode for performing a cryptographic function controlled by cryptographic keys, a cryptographic data key generator, a key notarizer connected to the key generator for notarizing the data keys so as to identify the encrypting user generating a data key and the intended decrypting user of data encrypted with the data key, and a key loader connected to the key notarizer for loading notarized data keys into the performing apparatus as cryptographic keys such that only a data key generated by the user who is loading is operative when the performing apparatus is being operated in the encrypt mode. Preferably, the key notarizer comprises apparatus for encrypting data keys with the performing apparatus using a notarizing key which is derived from a first combination of identifier designations corresponding to the generating user and intended decrypting user, respectively, arranged in an ordered pair, and the key loader comprises apparatus for decrypting notarized keys with the performing apparatus using a decrypting key derived from a second combination of identifier designations formed by the user's identifier designation and a second designation supplied by the user arranged in a predetermined order in dependence on the mode in which the performing apparatus is to be operated.

Other features and advantages of the present invention are stated in or apparent from the detailed description of the preferred embodiment of the invention found hereinbelow.

DETAILED DESCRIPTION OF PREFERRED EMBODIMENTS

Figure 1:
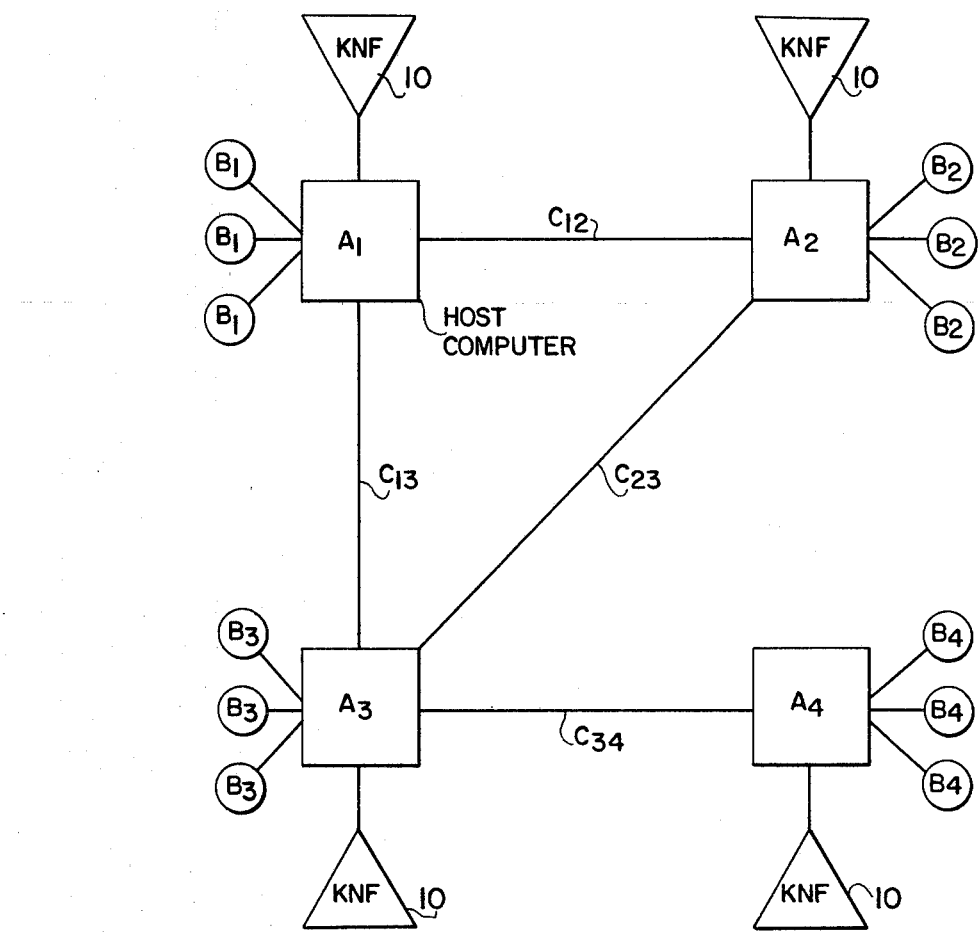
FIG. 1 is a schematic block diagram showing a computer network incorporating the apparatus of the present invention.

Referring to FIG. 1, embodiments of apparatus constructed in accordance with the present invention will be described which are designed for use with conventional computer networks comprising host computers, generally denoted A, and user terminals, generally denoted B. Each host computer A controls the normal operation of the associated terminals B. Each terminal B has the capability of communicating with the corresponding host computer A, with other local terminals B through the corresponding host computer A, and with terminals of other host computers via communication channels. The communication channels between host computers A are called interchanges and have been generally denoted C in the figures.

Interchanges C may be electronic communications lines, microwave links, courier routes, etc., or combinations of more than one medium. In FIG. 1, only computer host $A_3$ shares an interchange with computer host $A_4$. If host $A_1$ (that is, the cryptographic apparatus associated with host $A_1$) shares a common interchange cryptographic key with host $A_4$ (that is, the cryptographic apparatus associated with host $A_4$), then host $A_1$ may communicate with host $A_4$ through host $A_3$ without intermediate decryption and reencryption. Host $A_3$ would merely act as a switch. If host $A_1$ does not share a common cryptographic key with host $A_4$ but does share a key with host $A_3$, and if host $A_3$ shares a key with host $A_4$, then host $A_1$ may communicate with host $A_4$ via host $A_3$. The key used to encipher the data of host $A_1$ is encrypted and sent to host $A_3$. Host $A_3$ decrypts the key and reencrypts it for transmission to host $A_4$. The data which is encrypted under the common data key is merely passed through host $A_3$ and is decrypted only by the intended receiver, host $A_4$.

Connected to each host computer A is the apparatus of the present invention housed in a physically secure facility, generally denoted 10 in the figures, which will be referred to hereinbelow as a Key Notarization Facility (KNF). Each user terminal B is able to use the KNF 10 of the corresponding host computer A by means of user commands. All commands are implemented by the apparatus contained within KNF's 10, and every KNF 10 has the capacity to generate cryptographic keys for distribution to other host computers A or KNF users.

The lines linking a KNF 10 and its host computer A and the lines linking each terminal B and its host A must be protected. These links can be physically secured or they can be secured by the addition of cryptographic devices (not shown) on each end of the links. Advantageously, when user authentication is accomplished by encrypting and decrypting user commands using passwords as the cryptographic keys, as will be described in more detail hereinbelow, the entire communication path from the terminal B of the user to the KNF 10 therefor, including the path through the associated host computer A, is cryptographically protected. By so doing, the host computer A cannot cause a security compromise by switching the commands passed to the KNF 10 of two separate users. When a user is editing a file in his host computer A, it is in plain text form, and the host A will have to protect the data from other users. Once the user has finished editing, he may command his KNF 10 to encrypt the data and store the resulting cipher in unprotected memory or send it to a remote user over an interchange C.

The described embodiments of KNF 10 are designed for use with embodiments of host computers A which have two types of memory (not shown). One memory is not accessible to any user and will be referred to as system memory. The other memory is accessible to users and will be referred to as user memory. Most conventional computers have means for protecting system memory from users, and some computers protect one user from another to some extent. The apparatus to be described assumes that the users can obtain read and write access to all notarized keys and notarized passwords stored in the memory of their host computer A.

Figure 2:
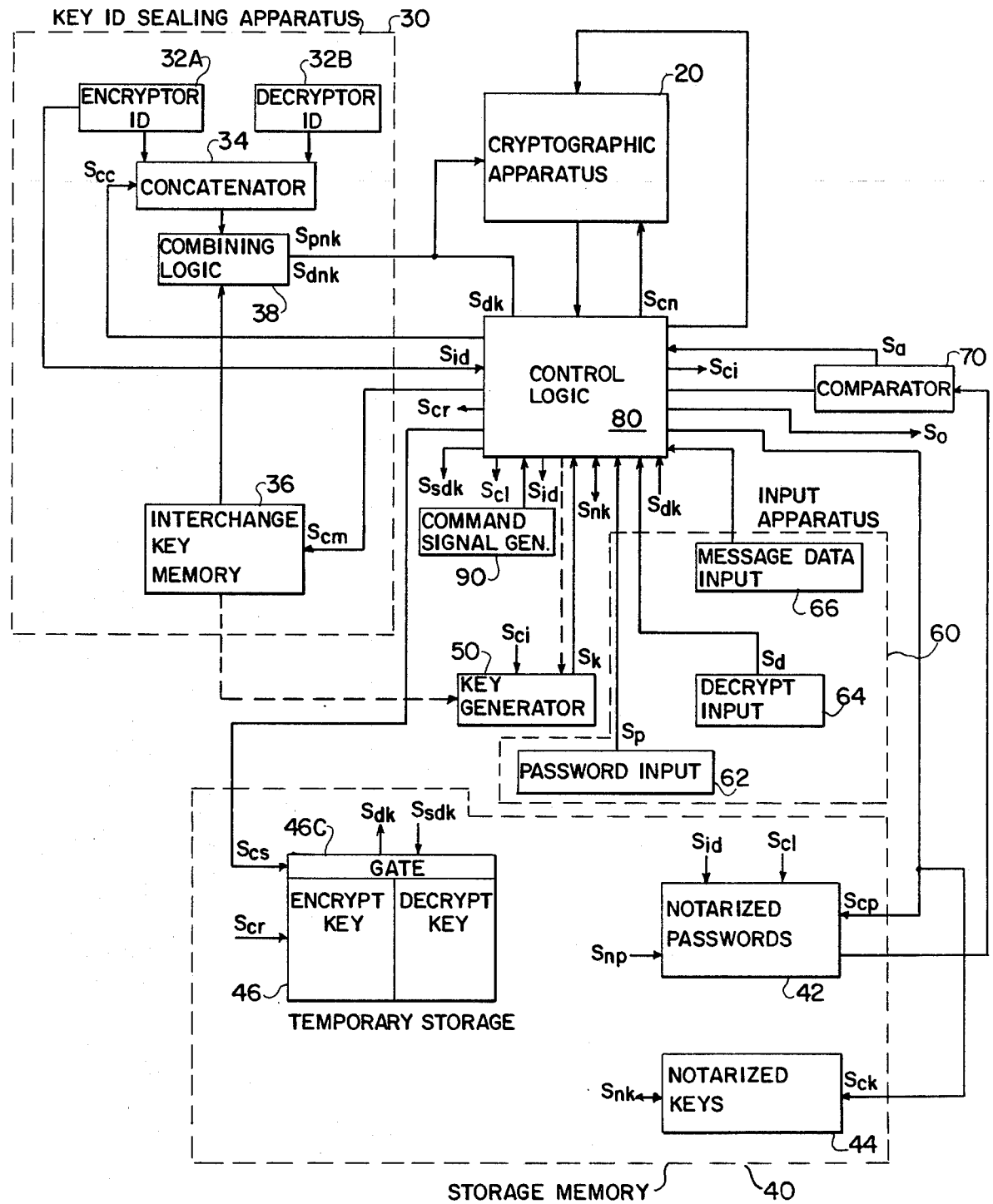
FIG. 2 is a schematic block diagram of a key notarization facility constructed in accordance with the present invention.

Referring to FIG. 2, each KNF 10 comprises conventional cryptographic apparatus 20 having a cryptographic key input and a data input for performing a cryptographic function controlled by cryptographic keys; key ID sealing apparatus, generally denoted 30, for notarizing cryptographic keys; addressable storage memory, generally denoted 40, for storing notarized passwords and keys, and for storing decrypted notarized keys for encrypting and decrypting message data; a key generator 50 for generating unpredictable data keys; input apparatus, generally denoted 60, for providing the inputs to be described in more detail hereinbelow to KNF 10; a comparator 70 used in confirming the identity of KNF users; control logic apparatus 80 for interconnecting and controlling the operation of the various other elements of KNF 10 in the manner to be described in more detail hereinbelow; and conventional user-actuated signal generating apparatus 90 for generating command signals in response to user commands to control logic apparatus 80.

Advantageously, any conventional nonpublic key cryptographic function which both encrypts and decrypts is used in cryptographic apparatus 20. Preferably, the DES cryptoalgorithm is employed. Several hardware devices implementing the DES cryptoalgorithm are commercially available.

As shown in FIG. 2, key ID sealing apparatus 30 comprises first and second input registers 32A and 32B, respectively, for receiving identifier designations supplied by a KNF user; a conventional concatenator 34 for combining the contents of registers 32A and 32B in a predetermined order in dependence on a set of three control signals $S_{cc}$ generated by control logic 80; conventional secured storage memory 36 addressable by a variable control signal $S_{cm}$ generated by control logic 80 for storing secret interchange keys associated with the KNF 10; and conventional combining logic 38 for combining the output of memory 36 with the output of concatenator 34 to produce notarizing keys and notarized key decrypting keys.

The identifier designations stored in registers 32A and 32B uniquely identify, respectively, the KNF user and the user who is intended to share the message data being encrypted or decrypted. For clarity of description, KNF users will be referred to as the transmitter or encryptor, and the receiver or decryptor, depending on whether they are encrypting or decrypting data messages. As will be appreciated by those of ordinary skill in the art, the same user can be both the encryptor and the intended decryptor, as would be the case when a user is working with a personal file that is not to be shared. The identifier designations need not be secret. When the DES is being employed, the designations advantageously are binary vectors of up to 28 bits. As will be appreciated by those of ordinary skill in the art, the respective user designations need not be identical in length. With the DES though, the combined length of the encryptor and decryptor identifier designations advantageously does not exceed 56 bits unless identifier compression techniques are employed, in which case longer identifier designations can effectively be employed.

Interchange keys (IK's) are used for the exchange of keys between users. Advantageously, one interchange key, called the facility IK, is used for the encryption of KNF user passwords. Other IK's are available for the exchange of data keys between KNF's or subgroups of KNF. IK's are generated outside the network and are entered, either encrypted, under a special IK, or unencrypted, directly into memory 36 of a KNF 10. As will be appreciated, encrypted storage of IK's allows a portion of memory 40, which may be provided by the system memory of the associated host computer A, advantageously to constitute memory 36. Unencrypted storage of IK's permits two KNF's to enter the same IK without sharing another common key. One IK can be used to connect all the users of two host computers since a user may not decrypt a data key shared by two other users. The reason for this is that the identifiers of the two parties are involved in the encryption of the shared key. Therefore, the number of keys which need to be stored in the KNF is reduced.

As will be appreciated by those of ordinary skill in the art, control logic 80 advantageously is conventionally configured such that predetermined IK's are automatically addressed for selected operations. For example, the facility IK is automatically addressed for the password notarization operation. For other operations, such as, for example, data key notarization, the user advantageously is allowed to select the IK to be used. In addition, user access to use of IK's advantageously is limited to fewer than all possible IK's in accordance with predetermined access rights and use of some IK's advantageously is limited to only specialized personnel, such as security officers of the like, for special operations. Control logic 80 is thus advantageously conventionally configured such that the identifier designation supplied by the user determines the values of control signal $S_{cm}$ which the user can generate, and thus the IK's which the user can select. Of course, in no case does a user have knowledge of the IK's themselves.

For use with the DES, interchange keys preferably are 64-bit binary vectors having 56 pseudorandom bits and 8 parity bits. Numbering the bits from left to right (1, 2, ... 64), bits 8, 16, 14, ... 64 are the parity bits and are set to the complement of the modulo 2 sum of the previous seven bits.

Figure 3:
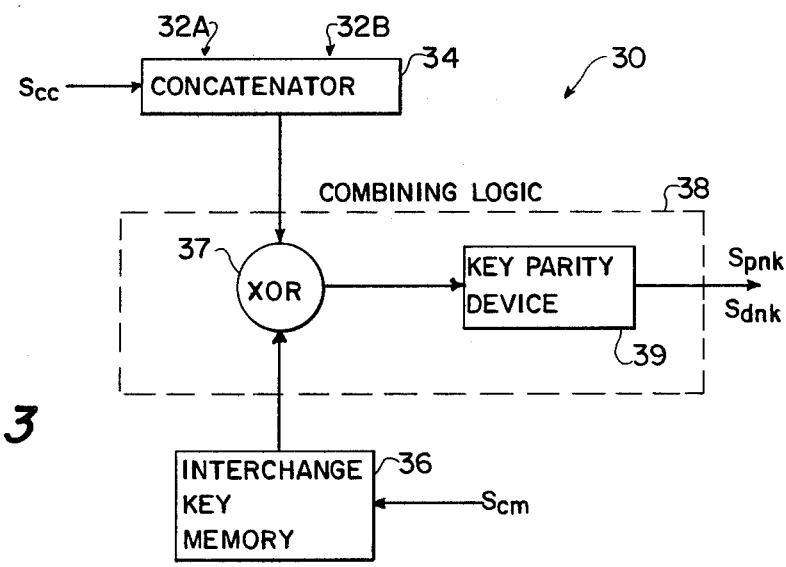
FIG. 3 is a schematic block diagram of a preferred embodiment of combining logic 38 shown in FIG. 2.

Logic 38 advantageously is configured so as to perform any conventional logic operation or set of operations which provides, for a given interchange key, a unique notarizing/decrypting key for each combination of identifier designations. Advantageously, as shown in FIG. 3, logic 38 comprises conventional circuitry 37 for exclusive-oring (bit-by-bit modulo 2 summing of) the output of concatenator 34 with the pseudorandom bits of the output of memory 36, and a conventional key parity device 39 for setting the parity bits in the manner described above to form a 64-bit key.

Figure 4:
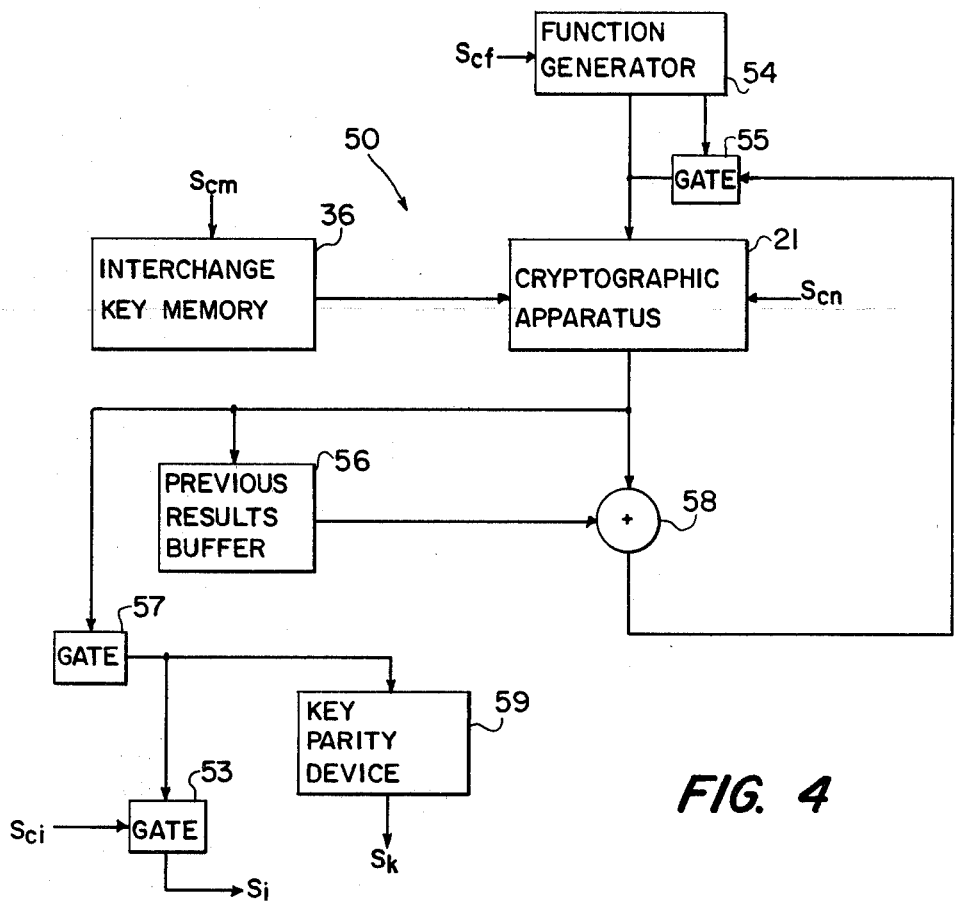
FIG. 4 is a schematic block diagram of a preferred embodiment of key generator 50 shown in FIG. 2.

Any conventional key generator advantageously constitutes generator 50. Further, data keys can even be generated manually using some form of "coin-flipping" or other randomized selection process. Preferably, the embodiment of generator 50 shown in FIG. 4 is employed, which utilizes cryptographic apparatus 21 to perform, for each data key generated, a predetermined number of iterative encryptions using a predetermined interchange key as the cryptographic key, the instantaneous output of a function generator 54 as the initial data input, and the combination of previous encrypted results with current encrypted results as the data input for successive encryptions.

As will be appreciated by those of ordinary skill in the art, cryptographic apparatus 20 advantageously constitutes apparatus 21. The operating mode and number of encryptions performed is controlled by a first control signal $S_{cn}$ generated by control logic 80, which also interconnects apparatus 20 with the other elements of generator 50. Similarly, the predetermined interchange key used as the cryptographic key in apparatus 20 is selected from the keys stored in memory 36 by control signal $S_{cm}$ generated by logic 80. The functional involvement of memory 36 and apparatus 20 in the preferred embodiment of key generator 50 has been schematically indicated in FIG. 2 by the dashed connecting arrows from memory 36 and control logic 80, respectively, to key generator 50.

An acceptable data key is generated with a sequence of three encryptions using a conventional date-time generator as generator 54, and providing a temporary storage buffer 56 and combining logic circuitry 58 for temporarily storing the output of apparatus 20 and for combining the output of buffer 56 with the output of apparatus 20, respectively. Advantageously, a conventional register which produces the previous contents thereof as an output each time a new input is loaded constitutes buffer 56, and conventional exclusive-or logic circuitry constitutes circuitry 58. The output of circuitry 58 is fed as a data input to cryptographic apparatus 20 via a conventional gate 55 which is triggered by the output of generator 54 so as to block the output of circuitry 58 as an input to apparatus 20 during the first encryption iteration. The output of apparatus 20 is also fed via a conventional gate 57 to a conventional key parity device 59. Key parity device 59 advantageously is configured such that every eighth bit of the output of gate 57 is reset so that the modulo 2 sum of the bits of each 8-bit byte is odd. Gate 57 is configured in a conventional manner (not shown) such that the output of apparatus 20 resulting from the second iteration of encryption is fed to key parity device 59. The output $S_k$ of device 59 constitutes the data key. Using representational language in which E[X](Y) represents the DES encryption of Y under key X in the electronic code book (ECB) mode of operation; FIK represents the facility IK; DT represents the output of generator 54; V represents a seed value which initially is set to any value for the first data key to be generated, and corresponds to the initial contents of buffer 56 at the beginning of the encryption sequence for a data key; and R represents the data key, it will be appreciated by those of ordinary skill in the art that the embodiment of generator 50 shown in FIG. 4 implements the following sequence of operations:

The first encryption iteration produces encryption results $I = E[FIK](DT)$, which are stored in buffer 56.

The second encryption iteration produces encryption results, which are used as the data key, $R = E[FIK](I \; XOR \; V)$.

The third encryption iteration produces encryption results, which are used as the new V for the next data key generation, $V = E[FIK](R \; XOR \; I)$.

As will be appreciated by those of ordinary skill in the art, the preferred embodiment of key generator 50 shown in FIG. 4 advantageously is also employed to generate the random initialization vectors employed by the DES cryptographic function. When an initialization vector output is desired, the output of gate 57 is employed. A conventional gate 53 controlled by a control signal $S_{ci}$ generated by control logic 80 advantageously is connected to the output of gate 57 as shown, such that the output $S_i$ of gate 53 constitutes the initialization vector.

Control logic circuitry 80 interconnects the various other components of a KNF 10 and provides control signals to control the operation thereof so as to implement the key generator shown in FIG. 4 and described hereinabove, and to implement the various circuit arrangements illustrated in FIGS. 5-6 8-10, to be described hereinbelow. Any conventional logic circuitry for implementing the various circuits under the control of predetermined user generated command signals from generator 90 advantageously constitutes logic circuitry 80. As will be appreciated by those of ordinary skill in the art, logic circuitry 80 and generator 90 can be readily implemented using conventional computer hardware, such as a microcomputer.

Key notarization and notarized key encrypting and decrypting will now be described with reference to the implementing circuits of FIGS. 5-9.

Preferably the first step in generating a notarized data key is authentication of the identity of the user seeking to use a KNF 10. Authentication advantageously is accomplished using any conventional physical, mechanical or electronic technique which allows only authorized users to operate a KNF 10. A preferred approach utilizes notarized passwords and advantageously is implemented by the password authenticator circuit, generally denoted 100, shown in FIG. 5 and the password notarizer circuit, generally denoted 200, shown in FIG. 6.

Password authenticator 100 comprises cryptographic apparatus 20; a password input register 62 or the like forming a part of apparatus 60 for receiving passwords supplied by KNF users connected to the data input of cryptographic apparatus 20; key ID sealing apparatus 30 connected to the cryptographic key input of apparatus 20; a notarized password storage memory portion 42 of memory 40 containing prestored passwords of authorized users in notarized form, preferably tagged with the corresponding identifier designations of the authorized users; and comparator 70 connected to the outputs of memory 42 and cryptographic apparatus 20. Control signal $S_{cm}$ is automatically generated by control logic 80 such that the facility IK is selected as the IK to be combined with the output of concatenator 34 in key ID sealing apparatus 30. A first control signal $S_{cc}$ generated by control logic 80 causes concatenator 34 of key ID sealing apparatus 30 to concatenate the identifier designation of the KNF user, as loaded by the user into register 32A, with itself, such that the output $S_{pnk}$ of apparatus 30 constitutes a notarizing key. A second control signal $S_{cn}$ generated by control logic 80 causes apparatus 20 to operate in the encrypt mode. A control signal $S_{cp}$ generated by logic 80 causes memory 42 to output the notarized password which corresponds to the user identifier designation supplied by the KNF user as an input to comparator 70. As will be apparent from the description hereinbelow, the output of cryptographic apparatus 20 constitutes the notarized version of the password supplied by the user. This notarized password is compared in comparator 70 with the prestored version thereof represented by the output of memory 42. If the two notarized passwords agree, comparator 70 produces an output $S_a$ which enables the KNF 10 for other use by the user. If the two notarized passwords do not agree, no output or a negative output is produced by comparator 70, the KNF 10 is disabled, and the user cannot proceed further with encryption or decryption.

Notarized passwords are stored in memory 42 using password notarizer 200. Password notarizer 200 is similar to authenticator 100 except that the output of apparatus 20 is connected to the input of memory 42 instead of comparator 70, as shown, and a control signal $S_{cl}$, which allows entry to memory 42 and which only a special predetermined security officer user is able to generate, is generated by control logic 80 to make an initial password entry. The first time a new authorized user seeks to use a KNF 10, he must be assigned a permanent identifier designation and initial password by the security officer user. The security officer user then generates control signal $S_{cl}$, which control logic 80 may be configured to accomplish in any conventional manner, and then enters the assigned identifier designation and password of the new user in key ID sealing device 30 and password input register 62, respectively, of the notarizer. The notarized password output of apparatus 20, $S_{np}$, is stored in memory 42, together with the identifier designation of the user. The user then accesses the KNF using password authenticator 100 and the assigned initial password. The user is then free to enter a new password of his own choosing and known only to himself using password notarizer 200. Once a user has introduced his own notarized password into memory 42, his ability to enable a KNF using password authenticator 100 authenticates his identity for encryption and decryption purposes.

Figure 7:
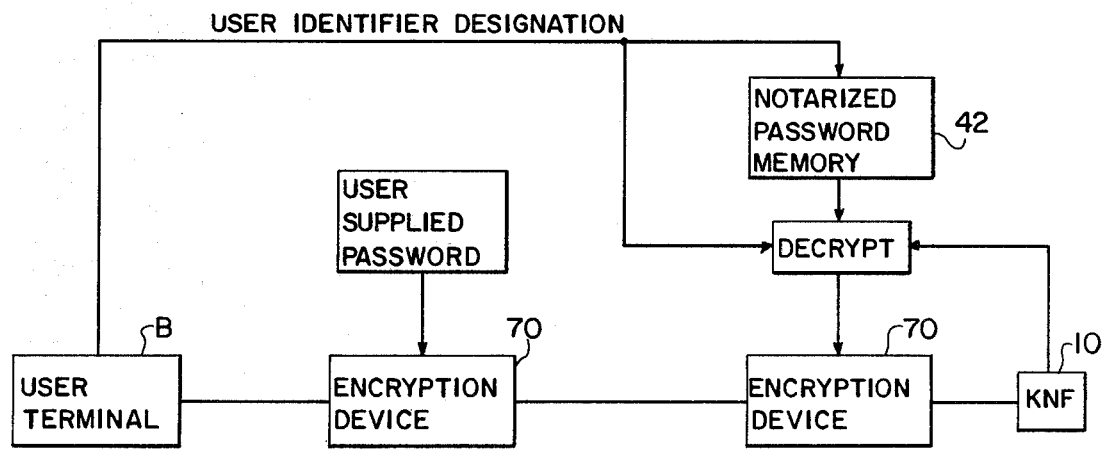
FIG. 7 is a schematic block diagram showing an alternative embodiment for user authentication in accordance with the present invention.
Figure 5:
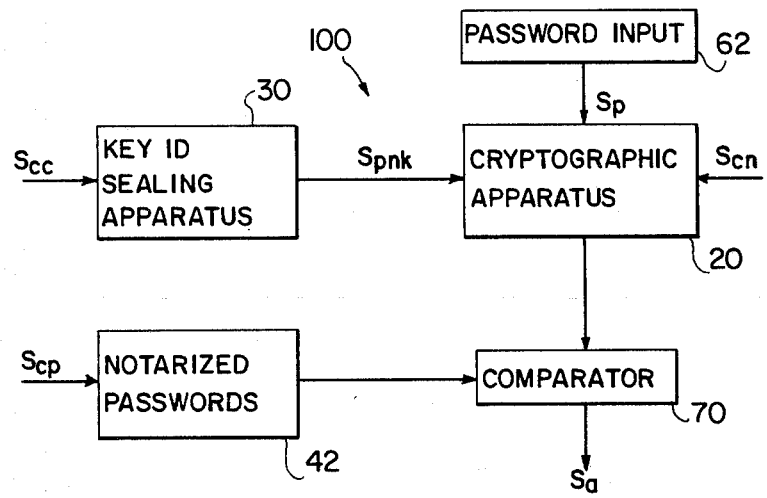
FIGS. 5 and 6 are schematic block diagrams showing the functional interconnection of the components shown in FIG. 2 for user authentication and password notarization, respectively, in accordance with the present invention.
Figure 6:
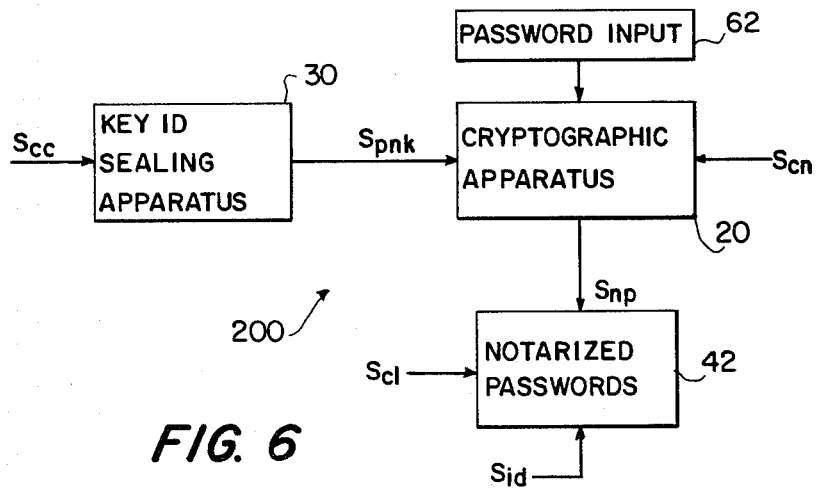

An alternative preferred approach to user authentication is illustrated in FIG. 7. In accordance with this approach, each user terminal B is linked with the associated KNF 10 via conventional encryption devices 70 such that selected communication between a terminal B and the associated KNF 10 is in encrypted form. Advantageously, encryption devices 70 utilize a cryptographic function, such as the DES function, which is controlled by cryptographic keys. Except for the user's identifier designation, which is transmitted in clear form, selected transmissions from terminal B are encrypted using a password designation supplied by the user or a function thereof as the cryptographic key. The encrypted transmissions from a terminal B are then decrypted at the KNF using a prestored version of the password or function thereof associated with the identifier designation transmitted by the terminal user. Similarly, selected transmissions from the KNF are encrypted using the prestored version of the password or function thereof as the cryptographic key, and the encrypted transmissions are decrypted at the terminal B using the password supplied by the terminal user or a function thereof as the cryptographic key. Preferably, the prestored versions of user passwords are stored in notarized form, as described hereinabove, in a memory 42 which is addressable by a signal corresponding to the user's identifier designation, and are decrypted by the KNF in the manner described herein for use as the encryption device 70 cryptographic keys. The identity of the user is thus automatically authenticated in this approach with each command by the fact that the user is able to communicate with the KNF.

Figure 8:
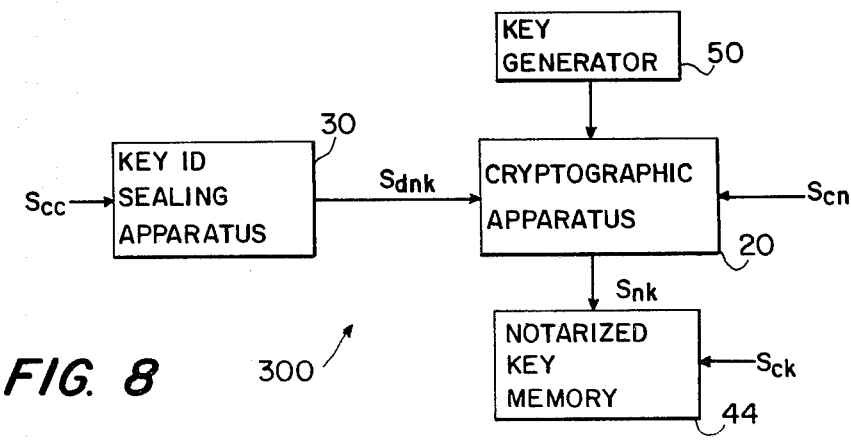
FIGS. 8-10 are schematic block diagrams showing the functional interconnection of the components shown in FIG. 2 for data key notarization, notarized data key loading, and data encryption or decryption, respectively, in accordance with the present invention.

Once a user has been authenticated, he is able to access the cryptographic features of a KNF 10. In accordance with the invention, cryptographic data keys for encrypting and decrypting data are made available to users only in notarized form. Preferably, a data key is notarized by encrypting the key with the encrypting function using as the cryptographic key a notarizing key derived from the encryptor's identifier designation, the identifier designation associated with the intended decryptor and a predetermined interchange key. A preferred data key notarizer, generally denoted 300, is illustrated in FIG. 8 and comprises cryptographic apparatus 20 controlled by the second control signal $S_{cn}$ generated by control logic 80 to operate in the encrypt mode; key generator 50 connected to the data input of apparatus 20; and key ID sealing apparatus 30 connected to the cryptographic key input of apparatus 20. Identifier designations supplied by the user and corresponding to the user's own identifier designation and the identifier designation of the intended decryptor are fed to input registers 32A and 32B of sealing apparatus 30. A second control signal $S_{cc}$ generated by logic 80 causes the contents of registers 32 to be concatenated in a predetermined first order so as to define an ordered pair. The output of concatenator 34 is combined with the predetermined interchange key in memory 36 addressed by the control signal $S_{cm}$ generated by logic 80 (either automatically or in response to a user command, as described hereinabove) to produce a second notarizing key $S_{dnk}$. The output $S_{nk}$ of apparatus 20 constitutes the notarized cryptographic data key. Advantageously, notarized keys are stored in a portion 44 of memory 40 for repeated use by a KNF user. As will be appreciated by those of ordinary skill in the art, each user may have a plurality of notarized data keys, and control logic 80 is thus advantageously configured to generate a variable control signal $S_{ck}$ in response to user command signals generated by generator 90 for selectively addressing the contents of memory portion 44.

As is conventional, data is encrypted and decrypted using a notarized cryptographic data key in the unnotarized, decrypted form thereof. In accordance with the present invention, a digital signature attribute is provided by loading notarized cryptographic data keys into cryptographic apparatus 20 for data encryption or decryption via key loading apparatus which allows the loading user to decrypt with any key, regardless of who generated it, so long as the loading user is the intended decryptor, but which allows the loading user to encrypt only with keys which the loading user has also generated.

Figure 9:
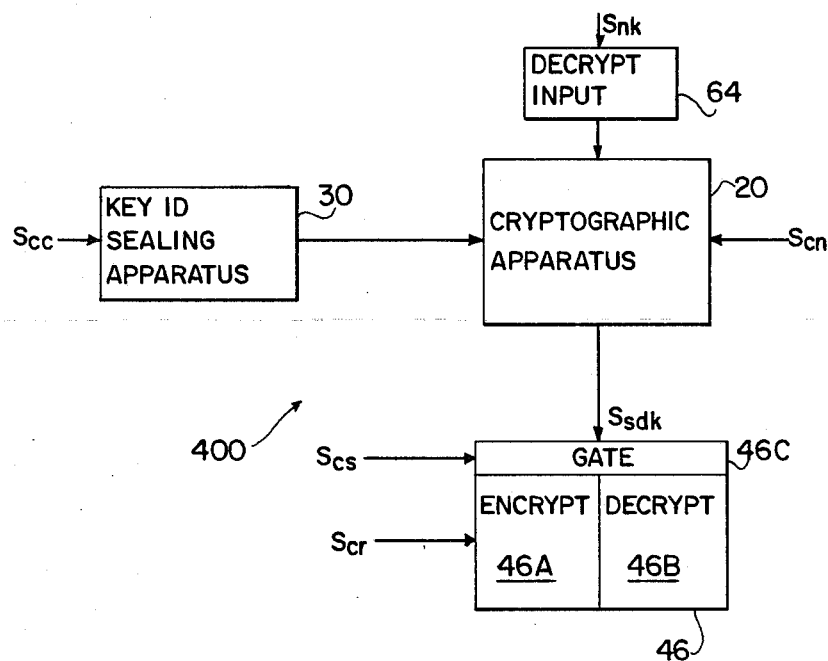

Preferred key loading apparatus, generally denoted 400, is shown in FIG. 9. Key loading apparatus 400 is generally identical to key notarizing apparatus 300 except that a third mode control signal $S_{cn}$ is generated by control logic 80 to operate apparatus 20 in the decrypt mode thereof. For shared keys, control logic 80 generates either the second control signal $S_{cc}$ or a third control signal $S_{cc}$ for control of key ID sealing concatenator 34 in dependence on whether the KNF user has requested (by means of command signal generator 90) to respectively encrypt or decrypt data. As noted hereinabove, the second control signal $S_{cc}$ causes the contents of registers 32A and 32B, which are loaded, respectively, with the user's identifier designation and the identifier designation of the other user intended to share the message, to be concatenated in a first predetermined order. The third control signal $S_{cc}$ causes the contents of registers 32A and 32B to be concatenated in the reverse order of the first order. It will be apparent to those of ordinary skill in the art from the foregoing that a notarized data key will be properly decrypted for data encryption by apparatus 20 only if the second control signal $S_{cc}$ was generated both when the key was notarized and when the key is loaded for data encryption, since only then will the same ordered pair of identifier designations be used to generate the cryptographic key controlling apparatus 20. It will be further apparent to those of ordinary skill in the art that apparatus 400 allows a KNF user to decrypt using both notarized keys which he has generated and notarized keys which other users have generated, so long as the KNF user is the intended receiver and the same interchange key is used.

In order to facilitate use of KNF's 10, such as for secured communication between users, key loading apparatus 400 advantageously further comprises a secured storage memory portion 46 of memory 40 for temporary storage of notarized data keys decrypted by a KNF user while he has access to the facility. Encrypting data keys preferably are stored segregated from decrypting data keys in order to preserve the digital signature attribute of the system and to allow a user to alternately encrypt and decrypt without having to reload keys. Memory 46 preferably is thus configured so as to define two sections, 46A and 46B, for storage, respectively, of decrypted data keys to be used for encryption and decrypted data keys to be used for decryption. Each memory section 46A and 46B is addressable by a different variable control signal $S_{cr}$ generated by control logic 80, and cannot be addressed by the control signal $S_{cr}$ for the other. Further, loading of memory sections 46A and 46B is controlled by a conventional gate 46C which is triggered by a set of control signals $S_{cs}$ generated by control logic 80. A first control signal $S_{cs}$ allows the output $S_{sdk}$ of key loading apparatus 400 to be stored in both memory sections 46A and 46B. A second control signal $S_{cs}$ allows the output $S_{sdk}$ of key loading apparatus 400 to be stored in memory section 46A and a third control signal $S_{cs}$ allows the output $S_{sdk}$ of key loading apparatus 400 to be stored in memory section 46B. As will be appreciated by those of ordinary skill in the art, control logic 80 is conventionally configured such that the memory loading control signal $S_{cs}$ which is generated is consistent with the concatenator control signal $S_{cc}$ which is generated, such that the first control signal $S_{cs}$ is generated only when the first control signal $S_{cc}$ is generated, and so on.

Figure 10:
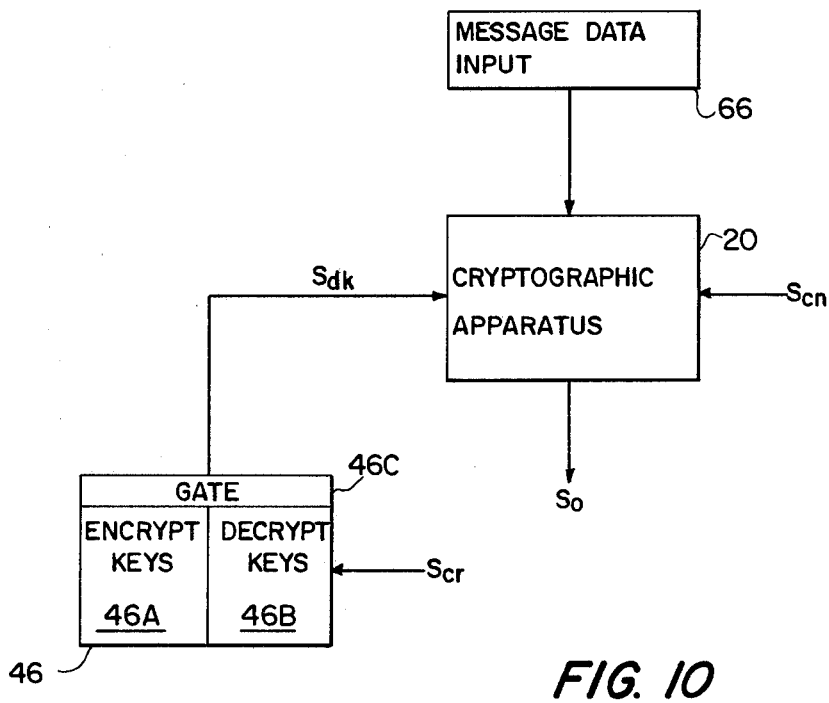

Referring to FIG. 10, once a KNF user has loaded a decrypted notarizing key into the cryptographic key input of apparatus 20, he is able to encrypt or decrypt message data, depending on whether he is the encryptor or intended decryptor, respectively, of the data. As will be appreciated by those of ordinary skill in the art, control logic 80 is conventionally configured so as to connect message data supplied by the KNF user by means of an input register 66 forming part of input apparatus 60 to the data input of cryptographic apparatus 20 for encryption or decryption in dependence on mode control signal $S_{cn}$ using the data key $S_{dk}$ selected by the user as the cryptographic key. The output $S_o$ of apparatus 20 provides either encrypted or decrypted information. As will be also appreciated by those of ordinary skill in the art, control logic 80 is conventionally configured such that the memory addressing control signal $S_{cr}$ which is generated is consistent with the mode control signal $S_{cn}$ which is generated, so that the user must encrypt with keys selected from memory section 46A and must decrypt with keys selected from memory section 46B.

If message data was encrypted for secret communication with another user, the transmitter would send the notarized version of the data key used to encrypt the message data to the intended receiver. In order to decrypt the message data, the receiver would have to authenticate his identity using a KNF 10 which shares the same interchange key as the transmitting KNF 10. Once authenticated, the receiver can load into his KNF 10 the notarized data key received from the transmitter by using key loading apparatus 400 and supplying the identity of the transmitter. As will be appreciated by those of ordinary skill in the art from the foregoing, in order for the notarized key to properly decrypt to the same data key used by the transmitter, the receiver must know the identity of the transmitter and be the intended receiver. By notarizing data keys with transmitter and receiver identifications, key substitution is prevented. The two parties would then share a common data key, but the transmitter can only encrypt, and the receiver can only decrypt with the data key. If the receiver wants to securely send data to the transmitter, he must generate his own notarized key in the same manner as the transmitter. It will be apparent that the notarized encryption technique of the present invention has a digital signature attribute since a transmitter can only encrypt and a receiver can only decrypt with a given notarized data key.

As will be appreciated by those of ordinary skill in the art, control logic 80 advantageously is conventionally configured such that the user's identifier designation is automatically loaded in key ID sealing register 32A during the user authentication process, and is retained therein after the authentication process has been completed for as long as the user has access to the KNF. Of course, as will be appreciated by those of ordinary skill in the art, the present invention can be readily implemented using conventional time-sharing techniques wherein a KNF 10 interacts with a plurality of terminals B simultaneously. In such a configuration, user identifier designations for a plurality of users are selectively loaded and unloaded into register 32A in dependence on which terminal B is actively interacting with the KNF 10 at any given moment. A conventional display (not shown) which is driven by control logic 80 advantageously then is also provided for generating prompting cues to the user for use in loading of key ID sealing register 32B. For example, if the authenticated KNF user has requested to notarize a data key or has requested to encrypt data using a notarized data key, he would be prompted to load the identifier designation of the intended decryptor. If the authenticated KNF user has requested to decrypt an encrypted message, he would be prompted to load the identifier designation of the encryptor.

It will also be appreciated by those of ordinary skill in the art that a single register of the like (not shown) advantageously constitutes input registers 62, 64, and 66. Further, it will be appreciated that a plurality of keys can be stored for a user while the user has access to a KNF and that the keys would be tagged for selective retrieval in a conventional manner.

It will also be appreciated that entities other than human users, such as, for example, computer programs, can constitute "users" having identifier designations.

Although the invention has been described with respect to exemplary embodiments thereof, it will be understood that variations and modifications can be effected in the embodiments without departing from the scope and spirit of the invention.

We claim:

1. A method for notarizing a cryptographic key used in the encryption and decryption of data with a cryptographic function controlled by cryptographic keys such that the data encryptor and intended decryptor are positively identified, the method comprising the step of:
   encrypting the cryptographic key with the cryptographic function using a notarizing key, derived from an identifier designation associated with the encryptor, an identifier designation associated with the intended decryptor, and an interchange key which is accessible only to authorized users of the cryptographic function, as the key encrypting cryptographic key.

2. The method of claim 1 further comprising the step of:
   authenticating the identity of the encryptor as a condition to the encryptor obtaining access to said interchange key.

3. The method of claim 2 wherein said authenticating step comprises the step of comparing a password designation supplied by the encryptor with a prestored version thereof which has been notarized by having been encrypted with the cryptographic function using a further notarizing key, derived from said identifier designation of the encryptor and an interchange key which is accessible only to authorized users of the cryptographic function, as the password encrypting cryptographic key.

4. The method of claim 3 wherein the interchange key used for notarizing cryptographic keys and the interchange key used for notarizing passwords are the same.

5. The method of claim 3 wherein said password notarizing key is derived by concatenating the binary equivalent of the encryptor's identifier designation with itself and logically combining the concatenated result with the interchange key.

6. The method of claim 1 wherein said cryptographic key notarizing key is derived by concatenating the binary equivalent of the encryptor's identifier designation with the binary equivalent of the decryptor's identifier designation as an ordered pair and logically combining the concatenated result with the interchange key.

7. The method of claim 5 or 6 wherein the concatenated result is exclusive-or'ed with the interchange key.

8. The method of claim 7 wherein the DES function constitutes the cryptographic function; the binary equivalents of the encryptor's and decryptor's identifier designations have a combined bit length of less than 57 bits; the interchange keys comprise 56 pseudorandomly generated bits and 8 parity bits determined by a parity formula; and the 56 bits of the concatenated result are exclusive-or'ed with the 56 pseudorandom bits of the interchange key and the 8 parity bits are set in accordance with the parity formula.

9. A method for generating a cryptographic data key for controlling data encryption and decryption using a cryptographic function comprising the steps of:
   encrypting an arbitrary initial value using the cryptographic function and a predetermined secret interchange key as the cryptographic key,
   combining the results of said encrypting step with the results of a previous encryption using the cryptographic function; and
   encrypting the results of said combining step using the cryptographic function and said interchange key as the cryptographic key to obtain the cryptographic data key.

10. The method of claim 9 further comprising the steps of:
    combining the results of the first of said encrypting steps with the results of the second of said encrypting steps; and
    encrypting the results of the second of said combining steps using the cryptographic function and said interchange key as the cryptographic key to obtain said results of a previous encryption for use when the first of said combining steps is next performed.

11. The method of claim 9 or 10 wherein the instantaneous value of a function generator constitutes said initial value.

12. The method of claim 11 wherein a date-time generator constitues said function generator.

13. Apparatus for generating a cryptographic data key for control of data encryption and decryption using a cryptographic function, said apparatus comprising:
    means for performing the cryptographic function using a predetermined interchange key as the cryptographic key;
    means for producing a variable output connected to the data input of said performing means;
    means for logically combining the present output of said performing means with a previous output thereof;
    means responsive to said variable output producing means for connecting the output of said combining means to the data input of said performing means such that the combining means output is not fed to said performing means in the presence of the output of said variable output producing means,
    means for actuating said variable output producing means and said performing means such that said performing means first encrypts the output of said variable output producing means and then repetitively encrypts the output of said combining means for a predetermined number of encryptions, the output of said performing means resulting from a predetermined one of the repetitive encryptions constituting the cryptographic data key.

14. Cryptographic apparatus comprising:

means for performing a cryptographic function controlled by cryptographic keys, said performing means being selectively operable in an encrypt mode and in a decrypt mode;

means for generating data keys for data encryption and decryption;

means connected to said generating means for notarizing said data keys so as to identify the encrypting user generating a data key and the intended decrypting user of the encrypted data; and means connected to said performing means for loading data keys into said performing means as cryptographic keys such that only a data key generated by the user who is loading is operative when said performing means is being operated in said encrypt mode.

15. The cryptographic apparatus of claim 14 wherein said notarizing means comprises means for encrypting said data keys with said performing means using a notarizing key as the cryptographic key, said notarizing key being derived from a first combination of identifier designations corresponding to the generating user and intended decrypting user, respectively, arranged in an ordered pair.

16. The cryptographic apparatus of claim 15 wherein said loading means comprises means for decrypting said notarized keys with said performing means using as the cryptographic key a decrypting key derived from a second combination of identifier designations formed by the user's identifier designation and a second identifier designation supplied by the user arranged with respect to each other in a predetermined order in dependence on the mode in which said performing means is being operated, said order being such that when said performing means is being operated in said encrypt mode the user's identifier designation has the same relative ordered position with respect to said second identifier designation as the generating user's identifier designation has with respect to the intended decrypting user's identifier designation in said first combination.

17. The cryptographic apparatus of claim 15 or 16 further comprising means for authenticating the identity of the user and for controlling the operation of at least one of said other means such that only authorized users can encrypt and decrypt data.

18. The cryptographic apparatus of claim 17 wherein said authenticating means comprises means for comparing a password designation supplied by a user with prestored versions of password designations for predetermined authorized users which have been notarized by having been encrypted with said performing means using a further notarizing key, derived from an identifier designation of the corresponding authorized user and an interchange key associated with said performing means, as the cryptographic key.

19. The cryptographic apparatus of claim 18 further comprising means connected to said means for encrypting data keys and to said means for decrypting notarized keys for combining said first and second combinations, respectively, with said interchange key to derive said notarizing keys and said decrypting keys, respectively.

20. The cryptographic apparatus of claim 16 further comprising means for selecting the operating mode of said performing means, and means responsive to said mode selecting means connected to said decrypting means for determining the order of identifier designations in said second combination.

21. The cryptographic apparatus of claim 20 wherein said loading means comprises first and second storage means and means responsive to said mode selecting means connecting the inputs of said first and second storage means to said decrypting means and the outputs of said first and second storage means to said cryptographic key input of said performing means such that the output of said decrypting means is stored in said first storage means and the output of said first storage means is fed to said performing means when data is being encrypted, and the output of said decrypting means is stored in said second storage means and the output of said second storage means is fed to said performing means when data is being decrypted.

* * * * *